(12) United States Patent
Hill et al.

(10) Patent No.: US 6,865,153 B1
(45) Date of Patent: Mar. 8, 2005

(54) STAGE-IMPLEMENTED QOS SHAPING FOR DATA COMMUNICATION SWITCH

(75) Inventors: Rex Hill, San Diego, CA (US); Dante Cinco, San Diego, CA (US)

(73) Assignee: Alcatel, Paris (FR)

( * ) Notice: Subject to any disclaimer, the term of this patent is extended or adjusted under 35 U.S.C. 154(b) by 998 days.

(21) Appl. No.: 09/718,696

(22) Filed: Nov. 21, 2000

Related U.S. Application Data

(60) Provisional application No. 60/234,028, filed on Sep. 20, 2000.

(51) Int. Cl.[7] .................................................. H04J 1/16
(52) U.S. Cl. .................................... 370/230.1; 370/392
(58) Field of Search ................................. 370/235, 252, 370/395.21, 395.3, 395.31, 395.32, 395.42, 395.43, 395.53, 335, 412, 429, 230.1, 469, 392, 471, 389, 434; 709/232

(56) References Cited

U.S. PATENT DOCUMENTS 6,104,700 A  *  8/2000  Haddock et al. ............ 370/235
6,154,446 A  * 11/2000  Kadambi et al. .......... 370/395.6
6,490,629 B1 * 12/2002  Milliken et al. ............. 709/232
6,647,004 B2 * 11/2003  Allen et al. ................. 370/335

FOREIGN PATENT DOCUMENTS

WO  WO 00/03256 A1   1/2000
WO  WO 00/56024 A2   9/2000

* cited by examiner

*Primary Examiner*—Duc Ho
*Assistant Examiner*—Phuongchau Ba Nguyen
(74) *Attorney, Agent, or Firm*—Christie Parker Hale LLP; Craig A. Hoersten; V. Lawrence Sewell

(57) ABSTRACT

A stage-implemented QoS shaping scheme is provided for a data communication switch. The stage-implemented QoS shaping scheme may be implemented by augmenting an existing packet forwarding logic. Inbound packets or other input signals enter the switch with inbound QoS or priority information. The inbound QoS information and packet header data are used by the switch to determine internal and outbound QoS information in stages. The first stage receives a key including addressing and other information and determines a QoS shaping index. In the second stage, the QoS shaping index is used to select QoS shaping maps, and the inbound QoS information is mapped to the QoS shaping maps to select internal and outbound QoS information.

23 Claims, 6 Drawing Sheets

US 6,865,153 B1

STAGE-IMPLEMENTED QOS SHAPING FOR DATA COMMUNICATION SWITCH

CROSS-REFERENCE TO RELATED APPLICATIONS

This application claims the benefit of the filing date of U.S. provisional patent application (Application No. 60/234,028), filed Sep. 20, 2000 and entitled "High Speed LAN Switching Controller," the contents of which are hereby incorporated by reference. This application contains subject matter related to U.S. patent application Ser. No. 08/721,101 filed Nov. 21, 2000 and entitled "QoS Shaping/Provisioning for Data Communication Switch."

FIELD OF THE INVENTION

The present invention relates to devices for determining the Quality of Service (QoS) in a data communication switch, and especially to devices for implementing QoS determination in stages in a data communication switch.

BACKGROUND OF THE INVENTION

Data communication switches typically have forwarding logic for assisting the packet forwarding process. In a conventional packet forwarding logic, a key including addressing and other information is typically used as an input to retrieve a result including forwarding information as an output.

With the emergence of quality of service (QoS), many switching protocols, such as IEEE 802.1Q and Differential Services (DiffServ), allow modification, or "shaping", of QoS information in inbound packets as part of packet processing. The modified QoS information is typically determined as a function of inbound QoS information and other flow properties such as the receiving port. The inbound QoS information should therefore be added to the array of information considered in the course of packet processing.

Many packet processing schemes accomplish this by simply adding the inbound QoS information into a packet forwarding logic input key. By integrating the inbound QoS information into the input key, the packet forwarding logic (through the resulting output) provides customized QoS shaping information for each combination of the inbound QoS information, addressing information and other information.

However, such individually tailored QoS shaping information typically comes at the price of a substantial increase in input key complexity. For example, this typically imposes considerable additional memory requirements, and often provides more flexibility than is needed since network administrators typically desire to provide an identical QoS shaping to packets that include many different combinations of flow properties. Moreover, to the extent it is desired to augment conventional packet forwarding logic with QoS shaping characteristics, a technical obstacle may be presented by hard-coded key size limits that are difficult to upgrade.

Accordingly, there is a need for a QoS shaping scheme for a data communication switch that is realizable without integrating the inbound QoS information into the input key.

SUMMARY OF THE INVENTION

One embodiment of the present invention provides a quality of service (QoS) shaping method for a data communication switch. A packet having an inbound priority value is received. Then a QoS shaping index for the packet is determined in accordance with packet addressing information. A QoS shaping map for the packet is selected using the QoS shaping index. A priority value is selected based on the inbound priority value using the selected QoS shaping map.

Another embodiment of the present invention includes a data communication switch having a plurality of switching modules interconnected over a backplane. The switching modules include an access controller for receiving a packet from a network. The packet includes an input key and an inbound priority value. Switching modules also include a switching controller for receiving the packet from the access controller and for providing the input key as an output. The switching module also includes a packet forwarding logic and a QoS shaping logic. The packet forwarding logic receives the input key and provides a QoS shaping index as an output in response to the input key. The QoS shaping logic receives the QoS shaping index and the inbound priority value, and selects a priority value.

Yet another embodiment of the present invention includes a data communication switch having a stage-implemented QoS shaping scheme for a packet. The packet includes an inbound priority value. The switch includes first stage means and second stage means. The first stage means receives an input key including one or more packet flow properties and provides QoS shaping data as an output in response to the input key. The second stage means receives the QoS shaping data and provides an internal priority value and an outbound priority value in response to the QoS shaping data and the input priority value.

BRIEF DESCRIPTION OF THE DRAWINGS

These and other aspects of the invention may be understood by reference to the following detailed description, taken in conjunction with the accompanying drawings, which are briefly described below.

DETAILED DESCRIPTION

QoS is typically defined by fields, such as, for example, (1) the 3-bit 802.1Q tag field in Layer 2, (2) the 8-bit Type of Service (ToS) field in Layer 3, and (3) the 6-bit DiffServ in Layer 3 that are dedicated to defining QoS.

One embodiment of the present invention provides a stage-implemented QoS shaping scheme for a switch, such as 802.1Q aware bridge. The stage-implemented QoS shaping scheme broadly includes many aspects of QoS-related tasks, and may include but not limited to priority shaping, link sharing, bandwidth provisioning and bandwidth limiting. The switch may also be referred to as a data communication switch.

An analogous stage-implemented QoS shaping scheme may also be applied to other types of switches, such as DiffServ (differentiated services) aware routers. In DiffServ aware routers, the stage-implemented QoS shaping scheme may be implemented with respect to a DiffServ field in the header of a Layer 3 packet, e.g. IP datagram, as specified in IETF Request for Comment 2475 entitled, "An Architecture for Differentiated Services" (RFC 2475).

The stage-implemented QoS shaping scheme may be provided by augmenting an existing packet forwarding logic. Such stage-implemented QoS shaping scheme preferably is easily managed by a network administrator.

The stage-implemented QoS shaping scheme preferably includes two or more stages. In a first stage, a packet forwarding logic preferably returns a result including a QoS shaping index in response to an input key including flow properties associated with the packet. In a second stage, the QoS shaping index returned from the packet forwarding logic preferably is used together with inbound QoS information to determine internal QoS information for prioritizing the packet while in the switch, and/or outbound QoS information for inclusion in the packet prior to transmission as an outbound packet.

The use of the QoS shaping index to determine the internal and/or outbound QoS information for the packet may include returning a QoS shaping map from QoS shaping logic in response to the QoS shaping index. The determination of the internal and/or outbound QoS information may include selecting data in the QoS shaping map as the internal and/or outbound QoS information in accordance with inbound QoS information.

The inbound QoS information, the internal QoS information and the outbound QoS information may, for example, also be referred to as an inbound priority value, an internal priority value and an outbound priority value, respectively, or as an ingress QoS value, an internal QoS value and an egress QoS value, respectively. The inbound QoS information and the outbound QoS information may, for example, also be referred to as an ingress priority value and an egress priority value, respectively. The inbound packet and the outbound packet may, for example, also be referred to as an ingress packet and an egress packet, respectively.

Figure 1:
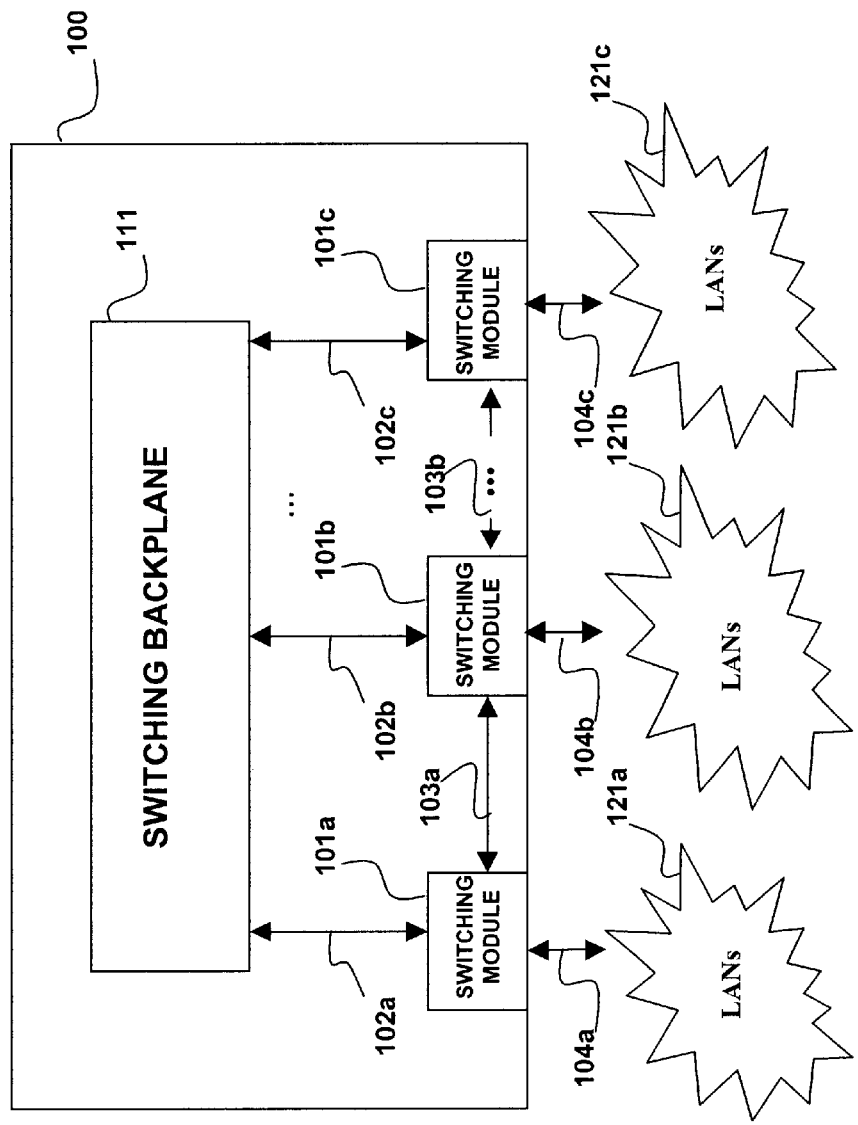
FIG. 1 is a switch in one embodiment of the present invention.

FIG. 1 illustrates a switch 100 in one embodiment of the present invention. Switch 100 preferably includes a switching backplane 111 coupled to switching modules 101a–110c. The switching backplane 111 may include a switching fabric, or switching fabric functions may be distributed between the switching backplane and the switching modules. The switching fabric (not shown) may also interface between the switching backplane 111 and the switching modules 101a–101c.

The switching modules 101a–101c preferably are coupled to one another over control paths 103a and 103b, respectively, and each switching module preferably is associated with one or more LANs 121a–121c. The LANs 121a–121c preferably include one or more virtual local area networks (VLANs). The switching modules communicate with the LANs over data interfaces 104a–104c.

The switching modules preferably interface with the switching backplane 111 over data paths 102a–102c, respectively. The switching modules preferably transmit packet data to the switching backplane 111 and receive packet data from the switching backplane 111. Depending on the source and destination addresses, an inbound packet from a switching module may be provided over the switching backplane 111 as an outbound packet to the same or different switching module.

The switching modules 101a–101c and the LANs 121a–121c are shown for illustrative purposes only. There may actually be more or less switching modules and LANs in this and other embodiments of the present invention. Further, in other embodiments, the switch may have a configuration that is different from the configuration of the switch 100 of FIG. 1.

Figure 2:
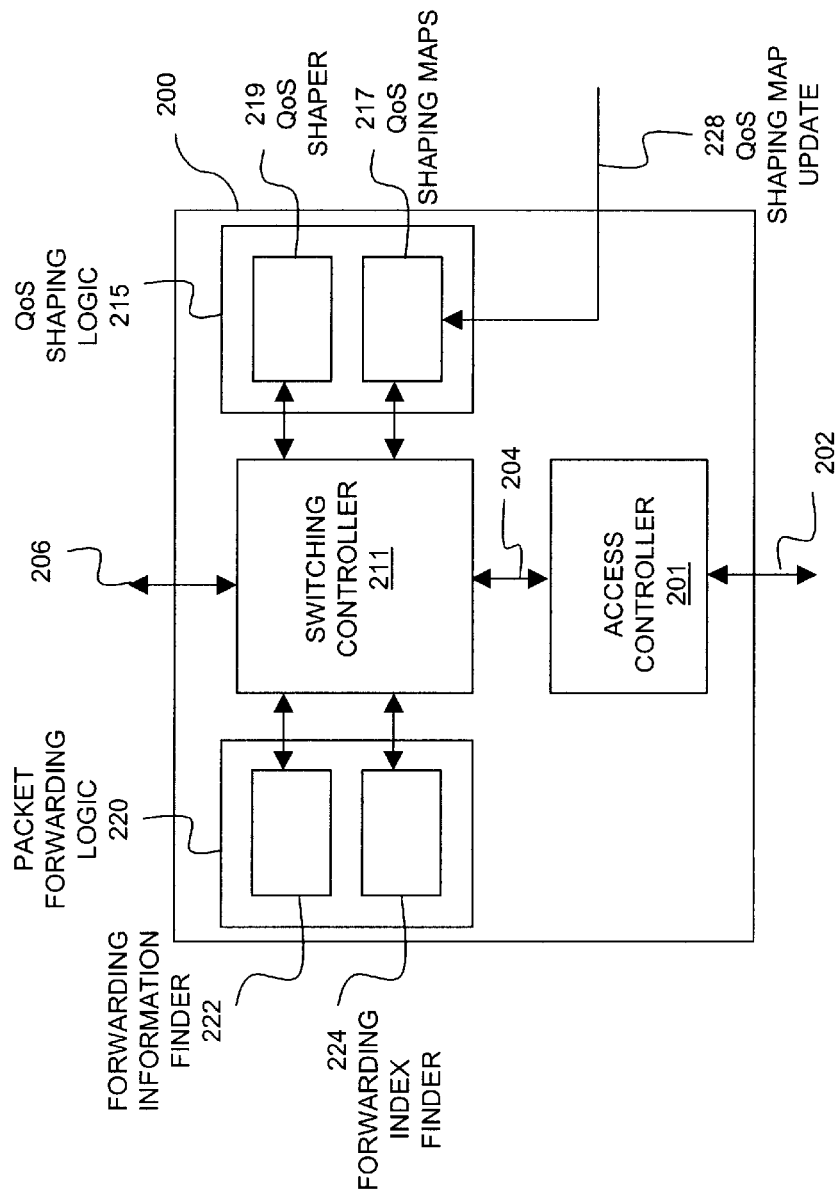
FIG. 2 is a switching module, which may be used to in the switch of FIG. 1.

FIG. 2 is a switching module 200 in one embodiment of the present invention. The switching module 200 may be used as one of the switching modules 101a–101c of FIG. 1. The switching module 200 preferably includes a stage-implemented QoS shaping scheme in which packet processing and QoS shaping/provisioning scheme are performed in multiple stages. The switching module 200 includes an access controller 201 coupled to one or more LANs over one or more data interfaces 202 and a switching controller 211 over an internal interface 204. The LANs may include VLANs.

The access controller 201 may include a media access controller (MAC). The access controller 201 preferably receives inbound packets from the LANs, formats them, and transmits them to the switching controller 211. The access controller 201 preferably also receives outbound packets from the switching controller 211, formats them, and transmits them to the LANs.

The switch 200 preferably also includes other elements that are used to facilitate packet processing operations. These switch elements preferably include but are not limited to a packet forwarding logic 220 and a QoS shaping logic 215. The QoS shaping logic 215 and the packet forwarding logic 220 preferably are coupled to the switching controller 211. The switch 200 may also include other sub-modules for performing various different tasks.

The switch 200 preferably is an ingress buffered switch, in which most of the large buffers are located at the inbound side. Thus, internal and outbound priority value determinations preferably are made at the inbound side where most of the buffers are located. In other embodiments, determination of the internal and outbound priority values may be done at the outbound side. In still other embodiments, determination of the internal and outbound priority values may be performed by distributed processing, in which some of the processing for determination of the priority values is done at the inbound side and some processing is done at the outbound side. If the priority values are added to the packet header, for example, QoS shaping/provisioning may be performed at the outbound side using outbound buffers.

QoS shaping may also be performed at the outbound side in order to perform true shaping. True shaping typically requires that packets wait very close to the link on which they are going to be transmitted and typically also requires a sort operation on those packets. When there is a huge set of packets waiting around in the outbound buffers, QoS shaping may be desirable to figure out which packet to send next.

The switching controller 211 preferably receives inbound packets, preferably subjects selected ones of them to internal and outbound QoS shaping, and transmits selected ones of them to the access controller 201 over the internal interface 204. In this embodiment, QoS shaping preferably is provided with the assistance of the QoS shaping logic 215 and the packet forwarding logic 220. In other embodiments, QoS shaping may be provided using other elements and/or logic.

An inbound packet to the switching controller 211 typically has an inbound priority value in the Layer 2 802.1Q/p header or the Type of Service (ToS) field in the Layer 3 IP header. The fields including three bits from either the 802.1Q/p header or the IP header may be used, but both fields typically are not used at the same time. For example, the inbound priority may be included in a 3-bit ToS precedence (ToSp) sub-field of the ToS field. The ToS field in the IP header may also be referred to as a differentiated services code point (DSCP) field or a DiffServ field.

When the inbound packet enters the switching controller 211, the switching controller preferably provides the inbound packet header to the packet forwarding logic 220. In other embodiments, the switching controller may provide the whole inbound packet to the packet forwarding logic. The packet forwarding logic includes a forwarding information finder 222 and a forwarding index finder 224. The forwarding information finder 222 may also be referred to as a header cache, and the forwarding index finder 224 may also be referred to as a look up engine or a pseudo-cam (pseudo-content addressable memory).

The forwarding index finder 224 preferably receives the inbound packet header. The forwarding index finder 224 preferably uses the Layer 2, 3, or 4 header information to access a routing table for an index. Addressing and other information in the header that is used to look up the index is also referred as a key or as an input key. The forwarding index finder preferably classifies the packet into a flow, which has an index associated with it. The index for the flow may also be referred to as an ID or a flow ID. Each flow preferably is associated with a unique index, and the packets that are classified onto the same flow preferably are associated with the same index. Each flow preferably is also associated with a priority class, which is going to be described in detail later in reference to internal and outbound priority mappings.

The forwarding index finder 224 preferably provides the index to the switching controller 211. The switching controller 211 preferably uses the index to look up a table entry in a large table associated with the forwarding information finder 222. The large table associated with the forwarding information finder may include, e.g., a next hop header table (NHHT).

The table entry, which may also be referred to as a flow descriptor, preferably has a number of fields for each packet on the flow. The table entry may contain information for performing tasks such as, for example, queue ID (QID) to specify the port number to be used by an outbound packet, maximum frame length, whether or not to perform 802.1Q tag stripping, and whether or not the packet will be processed by software. For example, the table entry in one embodiment preferably contains Layer 2 and Layer 3 information such as information on how to modify the header, VLAN ID, and a 6-bit priority description index (PDI), which may also be referred to as a QoS shaping index. In other embodiments, the table entry may also contain Layer 4 information. The PDI preferably facilitates mapping of inbound packets to different priority classes. In other embodiments, the number of bits in the PDI may be more or less than six.

The table entry preferably is then provided to the switching controller 211 to be used to further process the inbound packet. The switching controller preferably also provides the table entry to the QoS shaping logic 215 for packet processing including but not limited to priority shaping, link sharing, bandwidth provisioning and bandwidth limiting. The QoS shaping logic 215 includes QoS shaping maps 217 and a QoS shaper 219. The QoS shaper may include a queue manager, and functions of the QoS shaper may be distributed throughout the switching modules and the switching fabric (not shown) that interfaces between multiple switching modules. The QoS shaping maps 217 preferably receive the PDI and the 3-bit inbound priority value from the packet and preferably performs a table lookup for internal and outbound priority values.

Figure 3:
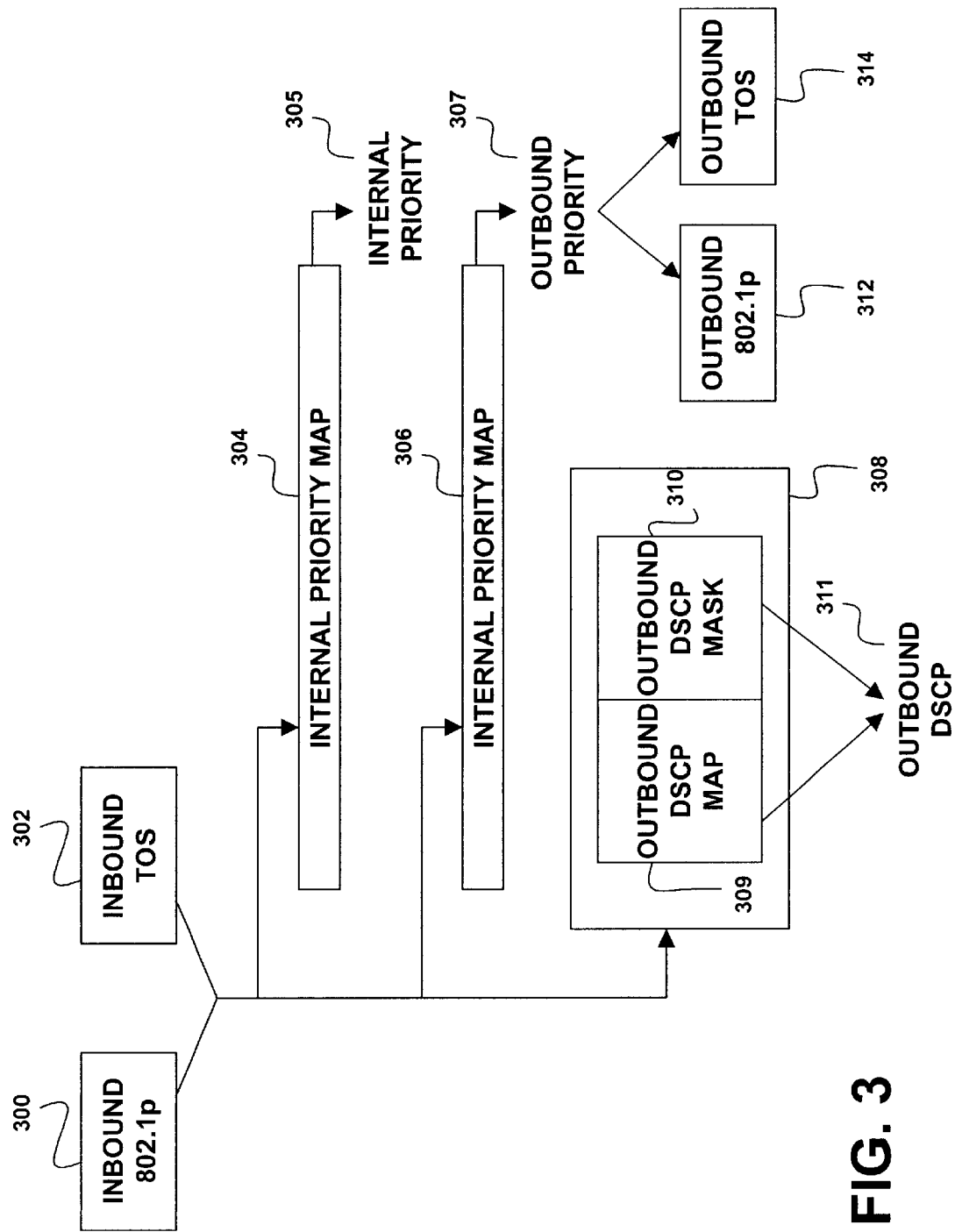
FIG. 3 illustrates mapping of inbound priority values into outbound priority values in one embodiment of the present invention.

FIG. 3 is an exemplary block diagram illustrating mapping of inbound 802.1p priority value and an inbound ToS priority value into an internal priority value, an outbound 802.1p priority value, an outbound ToS priority value, and an outbound DSCP (differentiated services code point).

The inbound priority values represented by inbound 802.1p value 300 and an inbound ToS value 302 preferably are used to derive an internal priority value 305 and an outbound priority value 307. The inbound 802.1p value is included in Layer-2 802.1Q/p header, and the ToS value is included in Layer-3 IP header. Depending on the mode of operation, the inbound priority value used may be the inbound 802.1p priority value 300 or the inbound ToS priority value 302. In addition, the outbound priority value 307 may be an outbound 802.1p priority value 312 or an outbound ToS priority value 314.

In other embodiments, the inbound 802.1p value and the inbound ToS value may also be provided to a DSCP table 308. For example, an 8-bit inbound DSCP value may be identical to the 8-bit inbound ToS value. The DSCP table 308 includes an outbound DSCP map 309 and an outbound DSCP mask 310. An outbound DSCP value 311 preferably is provided, depending on the mode of operation, either as a DSCP value in the table entry of the forwarding information finder, or as the modified inbound DSCP value. The inbound DSCP value may be modified through mapping to the DSCP map 309 and the outbound DSCP mask 310, wherein the DSCP mask may be used to modify some of the bits in the DSCP map.

Figure 4:
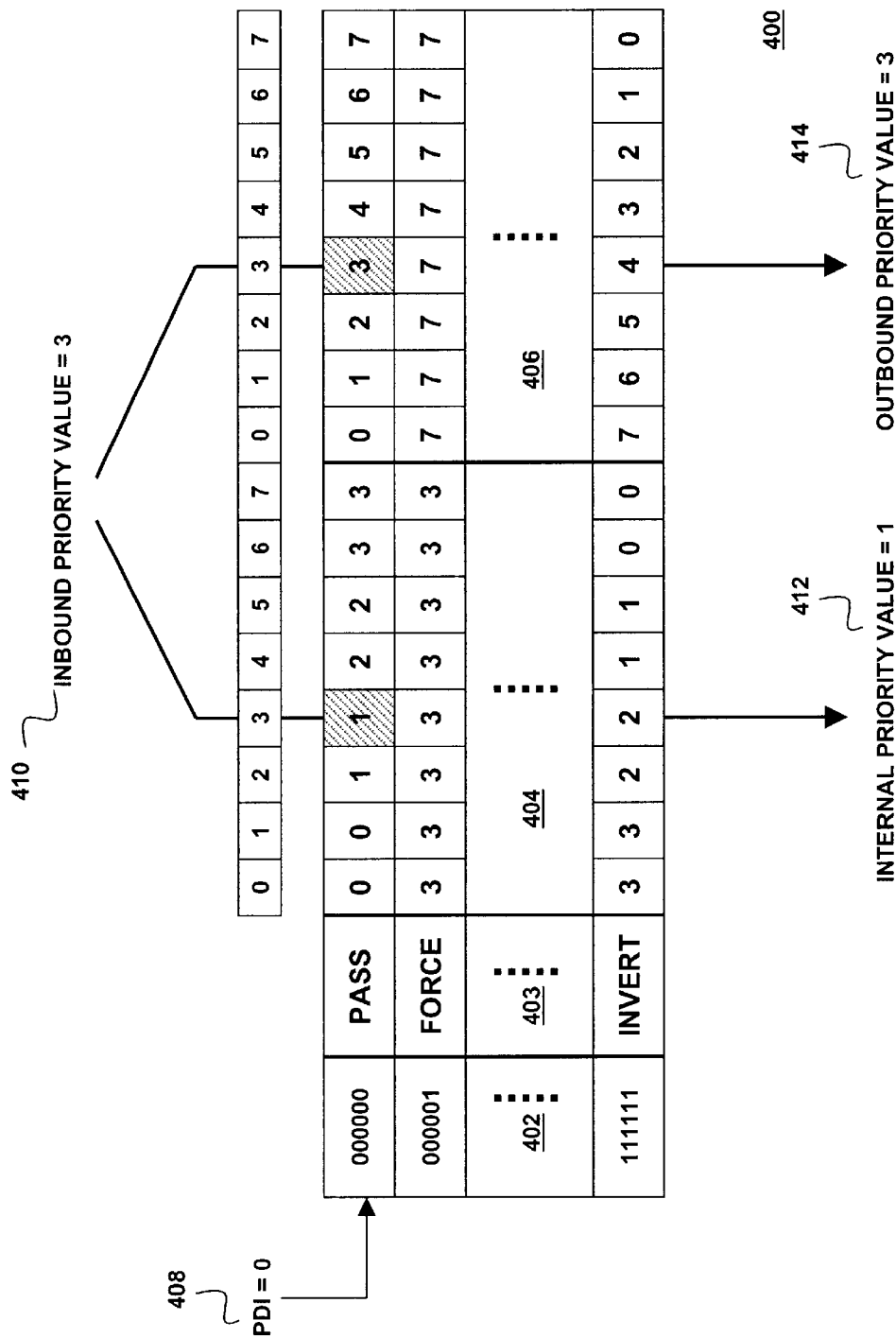
FIG. 4 is QoS shaping maps in one embodiment of the present invention.

FIG. 4 illustrates a set of shaping maps 400 within the QoS Shaping Maps 217 in one embodiment of the present invention. The QoS Shaping Maps 217 include a plurality of priority descriptor rows. The shaping maps 400 include internal priority maps 404 and outbound priority maps 406. Each priority descriptor row in this embodiment preferably includes an internal priority map including eight 2-bit values, and an outbound priority map including eight 3-bit values. Since the PDI is six bits in size in this embodiment, there may be up to 64 possible different priority descriptor rows that may be accessed using the PDI as an index. In other embodiments, the PDI may be more or less than six bits in size, and correspondingly, there may be more or less than 64 possible different priority descriptor rows.

Since internal priority values have only two bits and can have values between 0–3 in this embodiment, the 3-bit inbound priority values preferably are mapped to a 2-bit value during internal priority mapping. On the other hand, since outbound priority values have three bits, the inbound priority values may be mapped to the outbound priority values without losing any significant bits.

Each priority descriptor row preferably is associated with a priority class. The priority classes preferably are derived during packet classification from information in the packet header such as Layer 2 and Layer 3 source and destination addresses and Layer 4 port numbers. Each priority class preferably has the internal and outbound priority mapping values that are different from the internal and outbound priority mapping values of other priority classes. In other embodiments, two or more priority descriptor rows associated with different priority classes may have the same internal and/or outbound priority mapping values.

For example, in this embodiment, the priority classes may include PASS, FORCE and INVERT classes 403 associated with priority descriptor indices (PDIs) 402. These priority classes, for example, may be selected based on the source addresses of the inbound packets.

Each of the PDIs 402 preferably is associated with a particular priority class. For example, in FIG. 4, the priority index <000000> is associated with the PASS class, the priority index <000001> is associated with the FORCE class, and the priority index <111111> is associated with the INVERT class. Further, the PASS class may be associated with a server, the FORCE class may be associated with a PC, and the INVERT class may be associated with an erroneously configured network device.

As the name "pass" suggests, the outbound priority map associated with the PASS class preferably passes the inbound priority value and provides as an outbound priority value. Since only two bits are available in each internal priority value in this embodiment, two most significant bits of the inbound priority values preferably are used as internal priority values.

As the name "force" suggests, the internal and outbound priority maps associated with the FORCE class preferably force the internal and outbound priority values to 3 and 7, respectively. In other embodiments, other internal and outbound priority values may be associated with the FORCE class. In still other embodiments, there may be multiple different FORCE classes having different internal and outbound priority values.

As the name "invert" suggests, the internal priority map associated with the INVERT class preferably inverts the two most significant bits of the inbound priority value to provide as an internal priority value. Further, the outbound priority map inverts the entire inbound priority value to provide as an outbound priority value.

For example in FIG. 4, an internal priority map of <0,0,1,1,2,2,3,3> and an outbound priority map of <0,1,2,3,4,5,6,7>, respectively, are provided for PDI of <000000>. Therefore, when the inbound packet with a source address having the priority class of PASS is received, it may be provided with the PDI of <000000>. If that inbound packet has an inbound priority value of 3, the inbound priority value is mapped to an internal priority value of 1 and an outbound priority value of 3. Similarly, when inbound packets with source addresses having the priority classes of FORCE and INVERT are received, they may be provided with the PDI of <000001> and <111111>, respectively. Other priority classes and other methods of mapping may be used in other embodiments.

If a new set of mapping data is desired, the user may use a QoS shaping map update interface 228 of FIG. 2 to enter new internal and/or outbound maps into the shaping maps 400 at a PDI location from <000000> to <111111>. A shaping map update signal as well as the map data for updating may be provided to the QoS shaping maps over the QoS shaping map update interface 228.

In this and other embodiments, flow properties other than the source address, a destination address for example may be used to select the type of mapping used to convert the inbound priority values to internal priority values and outbound priority values, respectively.

Referring back to FIG. 2, after the internal and outbound priority values are identified, the QoS shaping maps 217 preferably return these priority values to the switching controller 211. The switching controller 211 preferably modifies the inbound packet to include the new priorities. The switching controller then sends the inbound packet having the new internal and outbound properties to the QoS shaper 219 so that the inbound packet can be put in an order for transmit as an outbound packet based on its new priority values.

The new outbound priority value is typically not used by the switching module 200. A switching module in a next switch preferably uses this new outbound priority value to generate the next set of internal and outbound priority values.

When the packet's priority is selected based on the new internal priority value, the QoS shaper provides the packet to the switching controller 211, which then provides the packet to the access controller 201 to be transmitted over the data interfaces 202 to the LANs.

Figure 5:
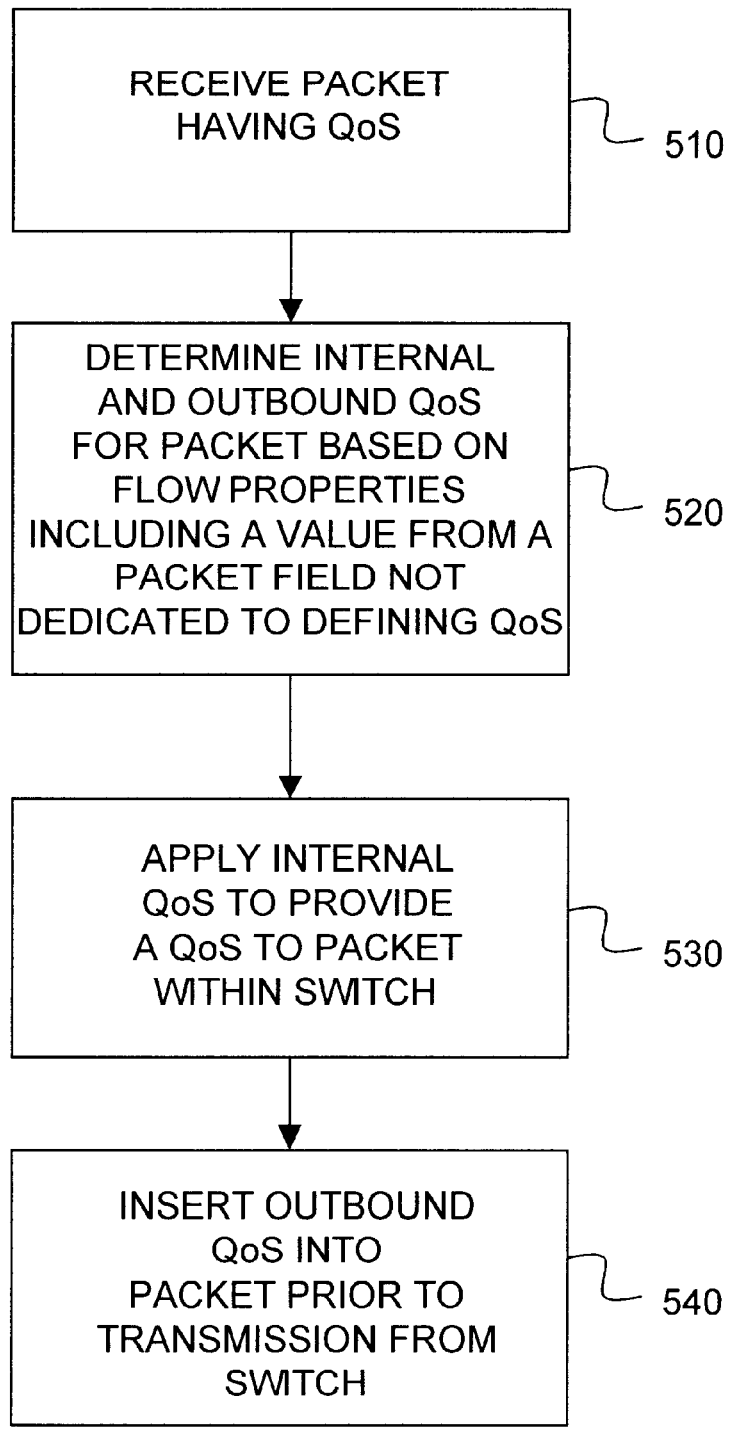
FIG. 5 is a flow diagram describing the QoS shaping/provisioning in accordance with one embodiment of the present invention.

FIG. 5 is a flow diagram of QoS shaping/provisioning in one embodiment of the present invention. An inbound packet having QoS is received by an access controller in a switch in step 510. The access controller, e.g., may be the access controller 201 of FIG. 2. The QoS may include but is not limited to a 802.1p priority value and a ToS priority value. If the inbound packet does not have QoS, it may be given a default priority based on its inbound port and protocol. The default priority may also be based on other flow properties such as Layer 2 and Layer 3 source and destination addresses, as well as Layer 4 port numbers.

The access controller preferably processes the inbound packet and sends it on to a switching controller, which may be similar to the switching controller 211 of FIG. 2. The switching controller in step 520 preferably determines new internal and outbound QoS for the inbound packet based on the flow properties, which may include a value from packet fields that are not dedicated to defining QoS, such as, for example, Layer 2 and Layer 3 source and destination addresses, as well as Layer 4 port numbers.

The switching controller 211 in step 530 preferably applies the new internal QoS to the inbound packet to provide a QoS prioritization to the inbound packet within the switch. The switching controller in step 540 inserts the outbound QoS to the inbound packet. The inbound packet is then provided to the switching module coupled with the LAN to which the inbound packet is provided as an outbound packet. The outbound packet is transmitted with the new QoS outbound priority. Depending on source and destination addresses of the packet, the switching module that transmits the outbound packet may be the same or different from the switching module that received the inbound packet, since the inbound packets received by one switching module may be provided to another switching module during packet processing over the switching backplane.

Figure 6:
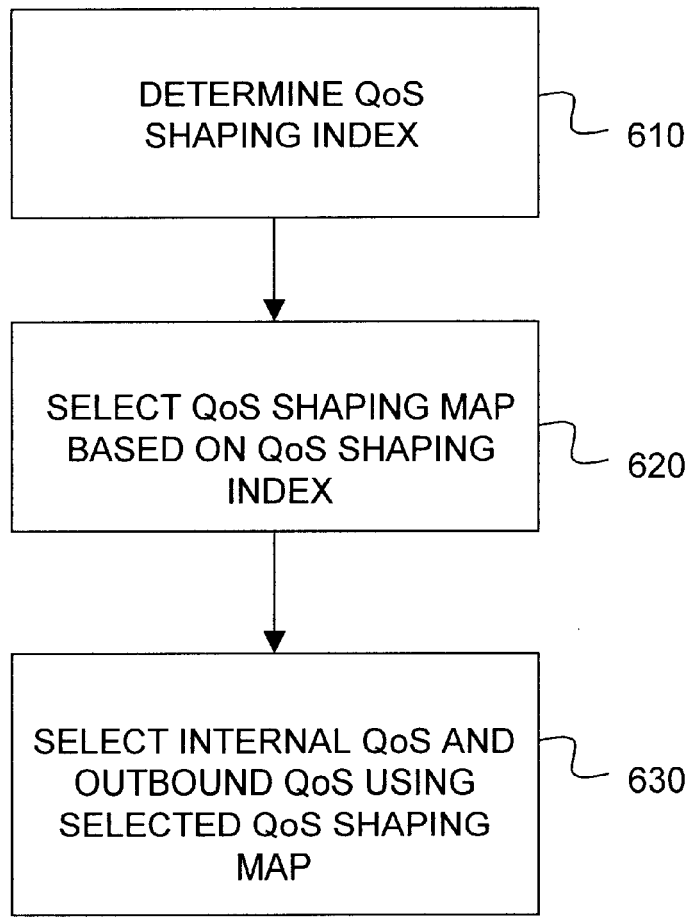
FIG. 6 is a flow diagram describing stage-implemented QoS shaping in accordance with one embodiment of the present invention.

FIG. 6 is a flow diagram of stage-implemented QoS shaping in one embodiment of the present invention. For example, step 520 of FIG. 5 may be implemented in stages as illustrated in FIG. 6. A QoS shaping index preferably is determined from the flow properties of an inbound packet in step 610, for example, in the packet forwarding logic 220 of FIG. 2. Then, an internal and outbound QoS shaping maps, e.g., in the QoS shaping maps 217, preferably are selected based on the QoS shaping index in step 620. Further, internal and outbound QoS values preferably are selected using the inbound QoS in step 630.

It will be appreciated by those of ordinary skill in the art that the invention can be embodied in other specific forms without departing from the spirit or essential character hereof. The present description is therefore considered in all respects to be illustrative and not restrictive. The scope of the invention is indicated by the appended claims, and all changes that come within the meaning and range of equivalents thereof are intended to be embraced therein.

For example, a switch may be used that has a configuration that is different from the switch described in the specification. For example, in the described embodiments, QoS shaping preferably is performed in a QoS shaper of the switching modules. In other embodiments, QoS shaping function may be a distributed process where some or all of QoS shaping is performed in other components such as a switching fabric. Further, in the described embodiments, QoS shaping preferably is performed by the switch during inbound processing of the packets. In other embodiments, QoS shaping may be performed by the switch during outbound processing of the packets. In still other embodiments, some parts of QoS shaping/provisioning may be performed during inbound processing and other parts of QoS shaping/provisioning may be performed during outbound processing.

We claim:

1. A quality of service (QoS) shaping method for a data communication switch, the method comprising:
   receiving a packet having an inbound priority value;
   determining a QoS shaping index for the packet in accordance with packet addressing information;
   selecting a QoS shaping map for the packet using the QoS shaping index; and
   selecting a priority value based on the inbound priority value using the selected QoS shaping map wherein the QoS shaping map is selected from a plurality of QoS shaping maps including internal priority maps and outbound priority maps.

2. The method of claim 1 wherein the inbound priority value includes information from at least one of a 802.1Q tag field in Layer 2, a Type of Service (ToS) field in Layer 3 and a DiffServ in Layer 3.

3. The method of claim 1 wherein the selected priority value includes an internal priority value, and the internal priority value is used to prioritize the packet while being processed in the switch.

4. The method of claim 1 wherein the selected priority value includes an outbound priority value, and the outbound priority value is included in the packet prior to transmitting the packet from the switch.

5. The method of claim 1 wherein the packet addressing information includes at least one of Layer 2 address information, Layer 3 address information and Layer 4 port number information.

6. The method of claim 1 wherein the QoS shaping map can be updated during operation of the switch.

7. The method of claim 1 wherein the step of selecting a priority value includes the step of mapping the inbound priority value to the selected QoS shaping map.

8. A data communication switch having a plurality of switching modules interconnected over a backplane, each switching module comprising:
   an access controller for receiving a packet from a network, the packet including an input key and an inbound priority value;
   a switching controller for receiving the packet from the access controller and for providing the input key as an output;
   a packet forwarding logic for receiving the input key and for providing a QoS shaping index as an output based on the input key; and
   a QoS shaping logic for receiving the QoS shaping index and the inbound priority value and for selecting a priority value based on the QoS shaping index and the inbound priority value wherein the selected priority value includes an outbound priority value, and the outbound priority value is included in the packet prior to transmission from the switch.

9. The data communication switch of claim 8 wherein the input key includes one or more flow properties associated with the packet.

10. The data communication switch of claim 9 wherein the input key includes at least one of Layer 2 address information, Layer 3 address information and Layer 4 port number information.

11. The data communication switch of claim 8 wherein the inbound priority value includes information from at least one of a 802.1Q tag field in Layer 2, a Type of Service (ToS) field in Layer 3 and a DiffServ in Layer 3.

12. The data communication switch of claim 8 wherein the QoS shaping logic includes a QoS shaper, and wherein the selected priority value includes an internal priority value, and the QoS shaper uses the internal priority value to prioritize the packet during processing in the switch.

13. The data communication switch of claim 8 wherein the QoS shaping logic includes a plurality of QoS shaping maps, and wherein the QoS shaping index is used to select the QoS shaping map to be used for selection of the priority value.

14. The data communication switch of claim 13 wherein the inbound priority value is mapped to the QoS shaping map to select the priority value.

15. A data communication switch having a stage-implemented QoS shaping scheme for a packet, the packet including an inbound priority value, the switch comprising:
   first stage means for receiving an input key including one or more packet flow properties and for providing QoS shaping data as an output in response to the input key; and
   second stage means for receiving the QoS shaping data and for providing an internal priority value and an outbound priority value in response to the QoS shaping data and the input priority value wherein the second stage means includes a plurality of QoS shaping maps, each QoS shaping map including either an internal priority map or an outbound priority map, and wherein the QoS shaping data is used to select one or more QoS shaping maps.

16. The data communication switch of claim 15 wherein the input key includes information from at least one packet field that is not dedicated to defining QoS.

17. The data communication switch of claim 15 wherein the inbound priority value is mapped to the selected internal priority map to select the internal priority value and the inbound priority value is mapped to the selected outbound priority map to select the outbound priority value.

18. The data communication switch of claim 15 the packet is associated with one or one or more priority classes, and the internal priority value and the outbound priority value are selected based on the associated priority class.

19. The data communication switch of claim 18 wherein the priority classes include at least one of a PASS class, a FORCE class and an INVERT class, and each QoS shaping map is associated with one of the priority classes.

20. The data communication switch of claim 18 wherein all packets of a flow including the packet is associated with the same priority class.

21. The data communication switch of claim 20 wherein use of the QoS shaping map associated with the PASS class results in selection of the outbound priority value for the packet that is identical to the internal priority value.

22. The data communication switch of claim 20 wherein use of the QoS shaping map associated with the FORCE class results in selection of an identical outbound priority value regardless of the inbound priority value.

23. The data communication switch of claim 20 wherein use of the QoS shaping map associated with the INVERT class results in selection of the outbound priority value that is bitwise inverse of the inbound priority value.

* * * * *